Patented Jan. 13, 1953

2,625,516

UNITED STATES PATENT OFFICE 2,625,516

DESICCANT

George D. Metzger, Cincinnati, and William Licht, Jr., Mariemont, Ohio

No Drawing. Application September 13, 1950, Serial No. 184,715

5 Claims. (Cl. 252—194)

This invention relates to drying or desiccating agents and to a method of preparing the same. More particularly, this invention relates to a drying agent or desiccant for removing moisture from fluids in refrigeration systems, from gases such as oxygen contained under pressure, and the like, and to an improved calcium sulphate base desiccant.

Calcium sulphate desiccants have a tendency to break down into dust or fine particles so that, when used for drying gases and liquids which pass through valves and pipe lines, the dust carries over and plugs the valves and other restrictions.

An object of this invention is to provide a drying agent composed of a mixture of calcium sulphate and at least one other chemical compound that renders the calcium sulphate non-dusting by preventing disintegration thereof into dust or fine particles.

A further object of this invention is to provide a granular calcium sulphate base drying agent having a bond between particles of each grain to prevent dusting which bond is formed by a material which is non-inflammable and substantially inert chemically.

It is known that the addition of a small amount of calcium chloride to a calcium sulphate base desiccant increases the drying activity and capacity thereof. However, the calcium chloride does not reduce the tendency of the calcium sulphate to break down into dust. In addition, the fluids used in refrigeration systems and the like tend to extract the calcium chloride from the calcium sulphate. A further object of this invention is to provide a coating and bond for granules containing calcium sulphate and calcium chloride which prevents or substantially reduces the loss of calcium chloride to the fluids dried thereby.

A further object of this invention is to provide a bond and coating for a calcium sulphate base desiccant which improves the drying capacity thereof.

Silicious materials, such as silica gel, have been proposed as drying agents but are not wholly satisfactory alone because of their low capacity and activity particularly at elevated temperatures. However, silicious drying agents do not break down or disintegrate into dust or fine particles in the presence of water. A further object of this invention is to provide a drying agent which combines the advantages of calcium sulphate, calcium chloride, and silicious drying agents and which has high capacity and activity but does not disintegrate into fine particles in the presence of water, refrigerating fluids, or the like.

A further object of this invention is to provide a method of forming a calcium sulphate base desiccant having a bond or coating of an alkali metal silicate such as sodium silicate to prevent dusting and disintegration thereof.

The material which we prefer to use as the starting material in preparing our desiccant is anhydrous calcium sulphate impregnated with calcium chloride to increase the drying activity thereof, but the coating or bond may be applied to unimpregnated calcium sulphate and is equally effective in preventing dusting of calcium sulphate or a mixture of calcium sulphate and calcium chloride. Granules of this starting material are treated by spraying with a dilute aqueous solution of an alkali metal silicate until the granules have a wet appearance but not until damp to the touch. The sprayed particles are allowed to cure by standing at room temperature for a short period and then are baked in an oven until dry. The granules are baked in a thin bed, preferably not over one granule thick, until the granules are substantially anhydrous. Then the granules are stored in an airtight container until ready for use.

The size of the granules of desiccant will be determined in large measure by the use to which the desiccant is put. For use in a refrigerant system, granular material in which the granules are approximately the size of rice grains is satisfactory. For other purposes, larger or smaller granules may be employed, or the granules may be molded in various forms such as sticks, pellets, flat discs, large or small lumps or the like.

The solution of alkali metal silicate preferably is a dilute solution having a specific gravity of approximately 1.136 measured at 20 degrees centigrade with reference to water at 20 degrees centigrade but may be as dilute as to have a specific gravity of 1.12 or as concentrated as to have a specific gravity of 1.2 measured at the same conditions. The particles are sprayed with this dilute aqueous alkali metal silicate solution until wet in appearance but not wet to the touch. About 26 c. c. of solution are required for each 100 grams of untreated desiccant, and the finished dried desiccant may contain from about 4 to 7 percent by weight of the alkali metal silicate, depending on the specific gravity of the treating solution used. Preferably we use sodium silicate or the commercial product known as water glass which may contain small amounts of potassium silicate as the alkali metal silicate because of the ready availability thereof, but potassium silicate solutions can be used instead, if desired.

The sprayed particles are permitted to cure for approximately thirty minutes at room temperature and conditions prior to baking and then are baked at a temperature which is sufficiently high to cause removal of the water to give a substantially anhydrous desiccant but not sufficiently high to substantially reduce the affinity of the calcium sulphate for water. Good results are obtained when the baking was carried on at approximately 218 degrees centigrade for three hours. The granules can be heated for a longer time, if desired, but three hours is usually sufficient for drying the granules. The temperaure at which the granules are dried should not exceed approximately 300 degrees centigrade, otherwise the calcium sulphate may lose its drying properties. For best results, the granules are dried in a bed substantially one granule in thickness to avoid agglomeration of granules.

The alkali metal silicate holds the particles of each granule together forming a bond between the particles which make up each granule. The alkali metal silicate is substantially inert chemically so that it does not affect fluids dried by the desiccant. However, the desiccant has a greater affinity for water than untreated calcium sulphate. The desiccant granules do not fall apart or form a powder in the presence of liquid water or alcohols as do untreated calcium sulphate base desiccants, and granules can be immersed in water or alcohols without injury. The coating and bond between particles makes the granules stronger and harder than untreated calcium sulphate granules and easier to handle.

The desiccant is particularly valuable for use in refrigerating systems because the bond and coating is not affected by refrigerating fluids, or by lubricating oils and alcohols which often are found in refrigerating systems. In addition, it is of particular value in drying materials such as oxygen because the sodium silicate bond and coating is substantially inert chemically and does not react with oxygen.

The granules may consist of anhydrous calcium sulphate and an alkali metal silicate bond and coating or may include an amount of an anhydrous deliquescent material such as calcium chloride sufficient to increase the activity thereof without being sufficient to render the desiccant moist. The amount of calcium chloride may be as much as approximately 13 percent by weight of the calcium sulphate or even more. However, if much more than 13 percent by weight of calcium chloride is used, the granules may become sensibly moist when sufficiently exposed to moisture. In order to increase the activity of the calcium sulphate, we prefer to intimately mix with the calcium sulphate about 4 percent by weight of calcium chloride. The bond and coating prevents the extraction of calcium chloride from the granules or limits the extent to which the calcium chloride is extracted from or washed off the granules in the presence of conventional refrigerants and prevents dusting of the granules, thus making it possible to use in refrigeration systems a desiccant consisting principally of calcium sulphate and calcium chloride which in itself is not satisfactory because of the corrosive nature of calcium chloride.

The following example is provided to illustrate in greater detail the method and product produced thereby, but it is to be understood that the example is given primarily by way of illustration and that the invention is not intended to be limited thereby except as set out in the appended claims.

Example 454 grams of granules each consisting of an intimate mixture of calcium sulphate and calcium chloride, the calcium chloride representing 4 percent by weight of the granules, the granules being between 8 and 10 mesh in size, were sprayed with 118 cc. of dilute aqueous water glass. The water glass was a commercial water glass solution diluted with distilled water to a specific gravity of 1.136. The water glass contained 3 moles of $SiO_2$ per mol of $Na_2O$. The amount of dilute water glass was sufficient to make the granules wet in appearance but not damp to the touch. The sprayed granules were allowed to dry by standing in a room at a temperature of 22 degrees C. for thirty minutes. Then the granules were baked in an oven at 218 degrees C. for three hours. The granules were substantially harder than untreated granules. The sample of the granules was placed in water and showed no breakdown after a period of three days.

The granules from which the desiccant is prepared may be of any desired size and shape. As already pointed out, the granules may contain from zero to about 13 percent by weight of calcium chloride. If a greater proportion of calcium chloride is used, the granules may become sensibly moist when sufficiently exposed to moisture because of the deliquescent nature thereof. The treating solution may vary in specific gravity from about 1.12 to 1.2 depending on the amount of coating and bond desired.

The invention is subject to various other modifications which will be apparent to those skilled in the art without departing from the spirit and scope of the appended claims.

Having described our invention, what we claim as new and desire to secure by Letters Patent is:

1. A granular desiccant composed of granules each consisting essentially of anhydrous calcium sulphate having a coating thereon of an alkali metal silicate, the weight of the coating being about 4% to 7% by weight of the desiccant and being sufficient to prevent dusting of the granules.

2. A desiccant in accordance with claim 1 characterized by the fact that the granules contain an amount of calcium chloride of not more than 13% by weight based on the weight of the calcium sulphate.

3. A method of forming a non-dusting calcium sulphate desiccant which comprises spraying calcium sulphate particles with a dilute aqueous solution of an alkali metal silicate until the surfaces of the particles are covered with a film of said solution, curing the sprayed particles at room temperature for approximately thirty minutes, and then baking the cured particles at a temperature of approximately 218 degrees centigrade for at least three hours.

4. A method in accordance with claim 3 characterized by the fact that the alkali metal silicate solution is of approximately 1.136 specific gravity.

5. A method in accordance with claim 3 characterized by the fact that the granules are baked in a layer substantially one granule in thickness.

GEORGE D. METZGER.
WILLIAM LICHT, Jr.

REFERENCES CITED

The following references are of record in the file of this patent:

UNITED STATES PATENTS

| Number | Name | Date |
| --- | --- | --- |
| 1,852,029 | Ruckelshaus et al. | Apr. 5, 1932 |
| 2,203,144 | Hammond | June 4, 1940 |

FOREIGN PATENTS

| Number | Country | Date |
| --- | --- | --- |
| 23,658 | Great Britain | 1905 |
| 579,094 | Great Britain | July 23, 1946 |